US009526039B2

(12) United States Patent
Ko

(10) Patent No.: US 9,526,039 B2
(45) Date of Patent: Dec. 20, 2016

(54) METHOD AND SYSTEM FOR CONTROLLING COMMUNICATION MODE OF TELEMATICS TERMINAL

(71) Applicant: Hyundai Motor Company, Seoul (KR)

(72) Inventor: Jae Yoon Ko, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 14/563,206

(22) Filed: Dec. 8, 2014

(65) Prior Publication Data

US 2016/0119823 A1 Apr. 28, 2016

(30) Foreign Application Priority Data

Oct. 27, 2014 (KR) ........................ 10-2014-0145851

(51) Int. Cl.
*H04W 36/00* (2009.01)
*H04W 24/08* (2009.01)

(52) U.S. Cl.
CPC ......... *H04W 36/0022* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 8,442,528 | B2 | 5/2013 | Chmielewski et al. | |
| 2013/0295889 | A1* | 11/2013 | Das ....................... | H04W 4/046 455/414.1 |
| 2016/0021697 | A1* | 1/2016 | Vargantwar ......... | H04W 76/028 370/329 |

FOREIGN PATENT DOCUMENTS

| | | | |
|---|---|---|---|
| KR | 10-2005-0060446 | | 12/2003 |
| KR | 10-2010-0099725 | A | 9/2010 |
| KR | 10-2014-0030692 | | 3/2012 |
| KR | 10-2013-0068584 | A | 6/2013 |
| KR | 10-1371422 | | 3/2014 |
| KR | 10-2014-0044713 | | 4/2014 |
| KR | 10-2014-0047975 | A | 4/2014 |
| KR | 10-2014-0073861 | A | 6/2014 |
| WO | 2012-033902 | A1 | 3/2012 |
| WO | 2013/045657 | A1 | 4/2013 |

* cited by examiner

*Primary Examiner* — Diane Lo
(74) *Attorney, Agent, or Firm* — Mintz Levin Cohn Ferris Glovsky and Popeo, P.C.; Peter F. Corless

(57) ABSTRACT

A method for controlling a communication mode in a telematics center associated with a telematics terminal through a mobile network is disclosed. The method includes receiving a voice over LET (VoLTE) setting state report message from the telematics terminal and determining whether VoLTE setting requires a change for the telematics terminal. When the VoLTE setting requires a change, a VoLTE setting change request message is transmitted to the telematics terminal.

17 Claims, 5 Drawing Sheets

| VEHICLE INFORMATION (VIN) (201) | VEHICLE TYPE INFORMATION (MODEL/CODE) (202) | MODEM INFORMATION (TERMINAL TELEPHONE NUMBER, ETC.) (203) | VoLTE SETTING STATE (204) | VoLTE APPLICABLE STATE (205) | POSITION INFORMATION (206) |
|---|---|---|---|---|---|
| K111111111 | TL | 1234567890 | Off | Off | TAC 1 |
| A222222222 | KH | 2345678901 | Off | ON | TAC 2 |
| ⋮ | ⋮ | ⋮ | ⋮ | ⋮ | |

200

| TA IDENTIFIER | VoLTE SUPPORT |
|---|---|
| TAC 1 | NO |
| TAC 2 | YES |
| TAC 3 | YES |
| . | . |

METHOD AND SYSTEM FOR CONTROLLING COMMUNICATION MODE OF TELEMATICS TERMINAL

This application claims the benefit of Korean Patent Application No. 10-2014-0145851, filed on Oct. 27, 2014, which is hereby incorporated by reference as if fully set forth herein.

BACKGROUND

Field of the Invention

The present invention relates to a method for controlling a communication mode of a telematics terminal, and more particularly, to a method, device, and system for controlling a communication mode of a telematics terminal, for adaptively controlling a voice over LTE (VoLTE) function of the telematics terminal including a long term evolution (LTE) function installed therein based on whether VoLTE is supportable in a corresponding mobile communication terminal.

Discussion of the Related Art

Recently, by virtue of the development of radio communication and digital convergence technologies, various inter-industry composite services and business models such as an infotainment system formed via convergence of information, entertainment, Internet service, etc. have been introduced. As a representative example, a telematics industry formed via convergence of information communication and vehicle industry satisfies convergence industrial flow.

In general, telematics refers to a wireless data service that provides information during movement of a vehicle. In particular, telematics is a wireless data service that transmits and receives information to and from a computer installed within transportation equipment such as a vehicle, a ship, etc. via a wireless communication technology, a global positioning system, a technology for exchanging a character signal and a voice signal over the Internet, etc. In particular, a telematics service for vehicles uses mobile communication technology and position tracking technology for a vehicle and provides vehicle accident or theft sensing, driving path guide, transport and living information, games, etc. to a driver in real time.

For example, a user is able to notify a service center of vehicle accident when the vehicle breaks down or a vehicle accident occurs during driving and receive an e-mail or check a road map through a computer monitor in front of a driver's seat, via the telematics service. In addition, the user is able to operate a computer game through a monitor installed at a rear seat and notify a mechanic of an accurate fault location and reason anytime because a computer installed in an engine records states of main parts of a vehicle.

A vehicle telematics terminal that has recently been released includes a mobile communication modem to wirelessly provide data communication and voice communication. In particular, when the mobile communication modem installed in the vehicle telematics terminal is a long term evolution (LTE) modem, an all-IP packet data service is provided. Accordingly, for voice communication, a voice over LTE (VoLTE) function of containing voice in LTE packet data and transmitting the LTE packet data can be provided.

Currently, according to a mobile communication provider, a method for supporting only data communication in an LTE network and supporting voice communication via a legacy 3$^{rd}$ generation (3G) network is adopted. However, when an LTE network supports a VoLTE function and all legacy 3G networks are replaced by LTE networks in the future, the vehicle telematics terminal may perform voice communication using a 3G modem. In particular, conventionally, a vehicle driver may not know when and where the VoLTE function can be supported, and thus there is no method for recognizing when a VoLTE communication function installed within the vehicle telematics terminal is activated.

The discussion of the related art is given to gain a sufficient understanding of the related art of the present invention only and it should not be interpreted that the related art belongs to technologies that are well-known to those of ordinary skill in the art.

SUMMARY

Accordingly, the present invention provides a method and system for controlling communication mode of telematics terminal that substantially obviates one or more problems due to limitations and disadvantages of the related art. An object of the present invention provides a method, device, and system for controlling communication mode of telematics terminal. Another object of the present invention provides a method and system for controlling communication mode of telematics terminal, for adaptively controlling a voice over LTE (VoLTE) function of a vehicle telematics terminal based on change in network coverage for VoLTE.

Another object of the present invention provides a method and system for controlling communication mode of telematics terminal, for installing an LTE communication modem during vehicle mass application and automatically activating a VoLTE function without any separate user manipulation when the VoLTE is supportable after a legacy 3G network is eliminated. A further object of the present invention provides a method and system for controlling communication mode of telematics terminal, for ensuring service continuity for voice communication without replacement of a separate telematics terminal or separate compensation costs according to support for the VoLTE function of a mobile communication company.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method, device, and system for controlling a communication mode of a vehicle telematics terminal is provided.

In an aspect of the present invention, a method for controlling a communication mode in a telematics center associated with a telematics terminal through a mobile network may include receiving a voice over LET (VoLTE) setting state report message from the telematics terminal, determining a required change for the VoLTE setting of the telematics terminal, and when the VoLTE setting changes are required, transmitting a VoLTE setting change request message to the telematics terminal.

The telematics center may be associated with a mobile communication company server, and the method may further include receiving a VoLTE activation request message from the mobile communication company server. The VoLTE activation request message may include VoLTE service application time information, and when the VoLTE service application time is reached, the VoLTE setting change request message may be transmitted to the telematics terminal.

The VoLTE activation request message may further include VoLTE serviceable coverage information regarding the mobile communication network, and whether VoLTE setting for the telematics terminal requires a change may be determined based on the coverage information. The VoLTE activation request message further include VoLTE service application target vehicle type information, and whether a vehicle type corresponding to the telematics terminal corresponds to the target vehicle type information may be determined and the VoLTE setting change request message may be transmitted to the telematics terminal.

The method may further include receiving a VoLTE setting change complete message from the telematics terminal, and updating VoLTE setting state information corresponding to the telematics terminal. In addition, the method may include receiving changed position information from the telematics terminal, wherein, when a VoLTE service is possible at the changed position, the VoLTE setting change request message for activation of a VoLTE function may be transmitted to the telematics terminal.

When the VoLTE service is impossible at the changed position, the VoLTE setting change request message for deactivation of the VoLTE function may be transmitted to the telematics terminal. The changed position information may include at least one of public land mobile network (PLMN) identification information, tracking area (TA) identification information, and cell identification information.

In another aspect of the present invention, a method for controlling a communication mode in a telematics terminal associated with a telematics center through a mobile network may include transmitting a voice over LET (VoLTE) setting state report message including current VoLTE setting state information and vehicle identification information that corresponds to the telematics terminal, to the telematics center, receiving a VoLTE setting change request message including a VoLTE activation indicator from the telematics center, changing VoLTE setting installed in the telematics terminal based on the VoLTE activation indicator, and transmitting a VoLTE setting change complete message indicating that VoLTE setting of the telematics terminal is completed based on the VoLTE setting change request message.

The method may further include acquiring position information of the telematics terminal and transmitting the position information to the telematics center. The position information may be acquired from system information broadcast by a base station (BS) of the mobile communication network. When the position information is changed, the changed position information may be transmitted to the telematics center. The position information may be acquired using a global positioning system (GPS) signal, and the position information may be transmitted to the telematics terminal whenever a vehicle including the telematics terminal installed therein moves by a predetermined distance.

The telematics terminal may include a communication modem having a third generation (3G) communication function and fourth generation (4G) communication function installed therein, and when a value of the VoLTE activation indicator means VoLTE function activation, the telematics terminal may be configured to perform voice call using the 4G communication function, and when the value of the VoLTE activation indicator means VoLTE function deactivation, the telematics terminal may be configured to perform voice call using the 3G communication function. The vehicle identification information may include at least one of a vehicle identification number (VIN), vehicle type information, and telephone number allocated to the telematics terminal.

In another aspect of the present invention, a computer readable recording medium having recorded thereon a program for executing any one of the above communication mode controlling methods may be provided. In another aspect of the present invention, a telematics center associated with a telematics terminal through a mobile communication network may include a receiver configured to receive a voice over LTE (VoLTE) setting state report message generated by the telematics terminal via the mobile communication network, a determiner configured to determine whether a change to the VoLTE settings for the telematics terminal is required, and a transmitter configured to transmit a VoLTE setting change request message including a VoLTE activation indicator to the telematics via the mobile communication network based on determining a required VoLTE setting change.

In another aspect of the present invention, a telematics terminal associated with a telematics center via a mobile communication network may include a transmitter configured to transmit a VoLTE setting state report message including current VoLTE setting state information and vehicle identification information that corresponds to the telematics terminal, to the telematics center, a receiver for receiving a VoLTE setting change request message including a VoLTE activation indicator from the telematics center, a changer configured to change VoLTE setting installed in the telematics terminal based on the VoLTE activation indicator, and a transmitter configured to transmit a VoLTE setting change complete message indicating that VoLTE setting of the telematics terminal is completed according to the VoLTE setting change request message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION OF THE INVENTION

Figure 1:
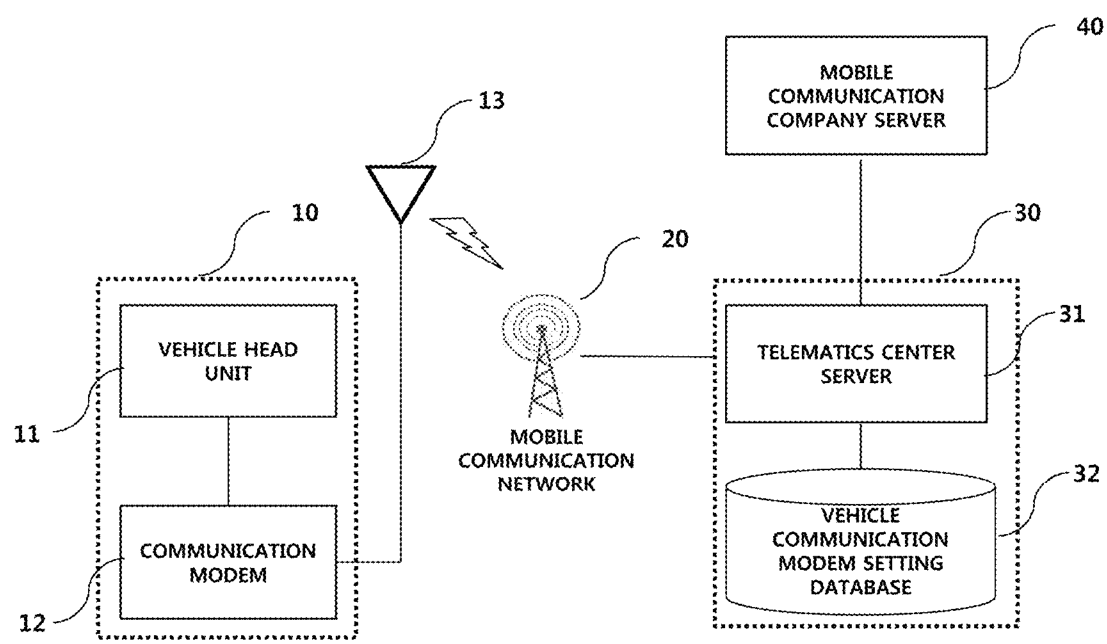
FIG. 1 is an exemplary diagram illustrating a structure of a telematics system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the exemplary embodiments of the present invention are described as integrated into a single one or to be operated as a single one, the present invention is not necessarily limited to such exemplary embodiments. According to exemplary embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present invention pertains. The computer program may be stored in computer readable media such that the computer program is read and executed by a computer to implement exemplary embodiments of the present invention. Computer program storage media may include magnetic recording media, optical recording media, and carrier wave media.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

FIG. 1 is an exemplary diagram illustrating a structure of a telematics system according to an embodiment of the present invention. Referring to FIG. 1, the telematics system may include a telematics terminal 10, a mobile communication network 20, a telematics center 30, a mobile communication company server 40, etc.

The telematics terminal 10 may be configured to include a vehicle head unit 11 and a communication modem 12. In particular, the communication modem 12 may be configured to provide a fourth generation (4G) communication function such as long term evolution (LTE) as well as a second generation (2G) or third generation (3G) communication function. The vehicle head unit 11 may be configured to communicate with the mobile communication center 30 that accesses the mobile communication network 20 via the communication modem 12.

The communication modem 12 may be configured to use various radio access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied using radio technology such as universal terrestrial radio access (UTRA) or CDMA2000. TDMA may be embodied using radio technology such as global system for mobile communications (GSM)/general packet radio service (GPRS)/enhanced data rates for GSM evolution (EDGE). OFDMA may be embodied using radio technology such as IEEE 802.11 (Wi-Fi), IEEE 802.16 (WiMAX), IEEE 802-20, evolved UTRA (E-UTRA), etc. UTRA is a part of a universal mobile telecommunications system (UMTS). Third generation partnership project (3GPP) long term evolution (LTE) is a part of evolved UMTS (E-UMTS), which uses E-UTRA and employs OFDMA in downlink and SC-FDMA in uplink. LTE advanced (LTE-A) is an evolved version of 3GPP LTE and is referred to as 4G communication to be differentiated from the aforementioned 3G communication.

The communication modem 12 may be configured to provide 3G and 4G networks according to the current standard communication standard and provide a function required for other networks e.g., 5G networks, etc. which has been discussed in the current international standard organization. The communication modem 12 may be connected to an integrated antenna 13 mounted on a vehicle and may be configured to transmit and receive a radio signal to and from the mobile communication network 20 through the integrated antenna 13. Data processed by the communication modem 12 may be transmitted to the vehicle head unit 11 or transmitted to the mobile communication network 20 that accesses the communication modem 12 through the integrated antenna 13.

The vehicle head unit 11 may be configured to transmit voice over LTE (VoLTE) setting state information to the mobile communication center 30 via the mobile communication network 20. In addition, the vehicle head unit 11 may be configured to activate or deactivate a VoLTE function of the communication modem 12 according to a VoLTE setting change request received from the mobile communication center 30. The vehicle head unit 11 may further be configured to activate or deactivate the VoLTE function of the communication modem 12 based on a user menu selection. When VoLTE setting of the communication modem 12 is changed by a user, the vehicle head unit 11 may be configured to transmit a predetermined message that indicates that VoLTE function setting of the communication modem 12 mounted in the corresponding vehicle has been changed, to the mobile communication center 30.

The vehicle head unit 11 may be configured to transmit current position information of the vehicle to the mobile communication center 30 when a specific event occurs. In particular, the specific event may be generated based on movement time or distance of the vehicle. As another example, the specific event may be generated when a tracking area code (TAC) is changed. The position information may then be the changed TAC information. As another example, the specific event may be generated when a public land mobile network (PLMN) identifier is changed. The position information may then be the changed PLMN identifier information. As another example, the specific event may be generated when a cell or base station (BS) that the corresponding communication modem 12 accesses is changed. The position information may then be cell identifier information. Identifier information of the PLMN that the communication modem 12 of the corresponding vehicle accesses, TAC information, and cell identifier information may be acquired from system information received from a BS of the mobile communication network 20.

A telematics center server 31 included in the mobile communication center 30 may be configured to operate the VoLTE function of the specific vehicle with reference to an internal vehicle communication modem setting database (DB) 32 that contains information regarding a VoLTE setting state for each vehicle and information for identifying whether VoLTE may be applied to the corresponding vehicle. For example, upon receiving a predetermined VoLTE coverage change message indicating that VoLTE coverage has been changed, from the mobile communication company server 40, the telematics center server 31 may be configured to transmit a predetermined control signal indicating VoLTE function activation to a vehicle positioned in coverage in which the VoLTE function is supported. Accordingly, the telematics center server 31 may be configured to acquire current position information for each vehicle from the telematics terminal 10 and maintain the current position information in the vehicle communication modem setting DB 32.

When a vehicle, a VoLTE function of which is activated, leaves a VoLTE serviceable region, the telematics center server 31 may be configured to transmit a predetermined VoLTE setting change request message for deactivating the VoLTE function to the corresponding vehicle. The telematics center server 31 may be configured to receive information regarding VoLTE function supporting time from the mobile communication company server 40. In particular, when the VoLTE function supporting time is reached, the telematics center server 31 may be configured to identify a vehicle, a VoLTE function to be activated, and transmit a predetermined VoLTE setting change request message indicating VoLTE function activation to the identified vehicle.

The case in which the mobile communication center 30 receives coverage change information of a VoLTE service and corresponding service application time information directly from the mobile communication company server 40 has been described. However, this is merely an example and a telematics service providing server (not shown) according to another exemplary embodiment of the present invention may be configured to acquire application time and VoLTE serviceable coverage information from the mobile communication company server 40. Further, the telematics service providing server may be configured to determine VoLTE service application time, application time (i.e., service coverage), and application target vehicle types and then transmit a VoLTE activation request message including the determined information to the mobile communication center 30.

Figures 2, 3:
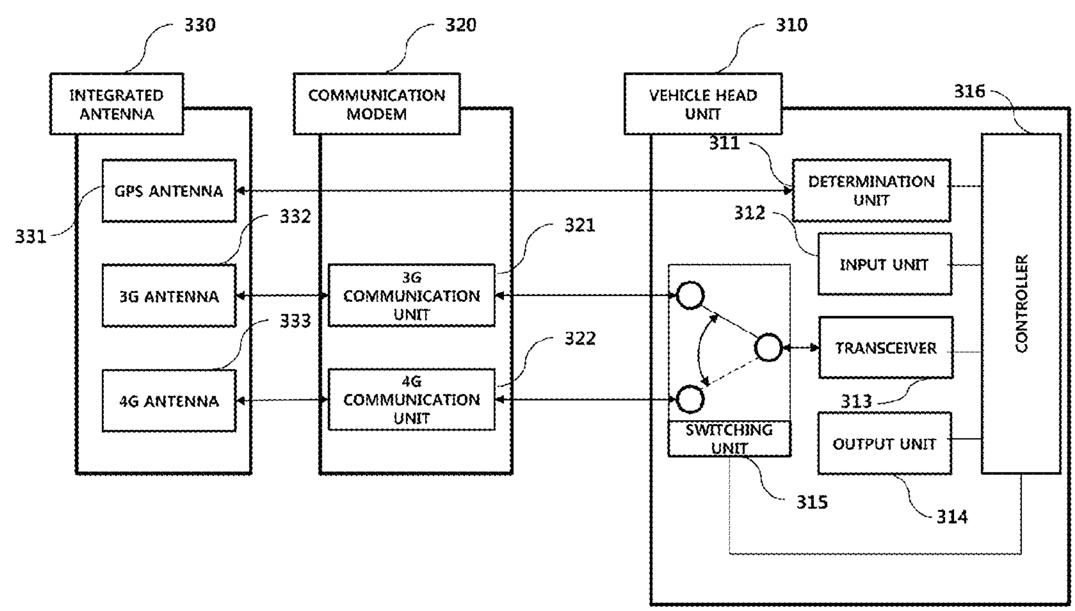
FIG. 2 is an exemplary diagram illustrating a structure of a vehicle communication modem setting database (DB) according to an exemplary embodiment of the present invention.
FIG. 3 is an exemplary block diagram for explanation of an internal structure of a vehicle telematics terminal according to an exemplary embodiment of the present invention.

FIG. 2 is an exemplary diagram illustrating a structure of a vehicle communication modem setting DB 200 according to an exemplary embodiment of the present invention. Referring to FIG. 2, the vehicle communication modem setting DB 200 may include a vehicle information field 201, a vehicle type information field 202, a modem information field 203, a VoLTE setting state field 204, a VoLTE applicable state field 205, a position information field 206, etc.

The vehicle information field 201 may be configured to record dedicated information for identifying a corresponding vehicle, such as a vehicle identification number (VIN). The vehicle type information field 202 may be configured to record code information or model number for identifying a model of the corresponding vehicle. The modem information field 203 may be configured to record device identification number or telephone number allocated to a telematics terminal installed in the corresponding vehicle.

The VoLTE setting state field 204 may, for example, be configured to record a Hyundai VoLTE function setting state of the corresponding vehicle. For example, when a value of the VoLTE setting state field 204 is “OFF”, the VoLTE function of a corresponding vehicle communication modem may be deactivated, and when the value of the VoLTE setting state field 204 is “ON”, the VoLTE function of the corresponding vehicle communication modem may be activated.

The VoLTE applicable state field 205 may be a field configured to identify whether the corresponding vehicle is in a state in which the VoLTE function may be applied and may be set based on VoLTE coverage change information received from the mobile communication company server 40 or application target vehicle information and VoLTE application time information received from a telematics service provider. In particular, the VoLTE coverage change information may include application time information and position information for applying the VoLTE function. The position information for applying the VoLTE function may be divided into a province unit, a city unit, a county unit, etc. from a geographical point of view. As another example, the position information for applying the VoLTE function may be divided into a PLMN unit, a TAC unit, a cell unit, etc. from a mobile communication network point of view.

For example, when a value of the VoLTE applicable state field 205 is "OFF", the VoLTE function of the corresponding vehicle communication modem may not be activated, and when the value of the VoLTE applicable state field 205 is "ON", the VoLTE function of the corresponding vehicle communication modem may be activated.

The position information field 206 may be a field configured to record current position information of the corresponding vehicle. For example, the position information field 206 may be configured to record TAC information that corresponds to a cell or base station (BS) that the corresponding vehicle currently accesses. As another example, the position information field 206 may be configured to record PLMN identification information that corresponds to a cell or BS that the corresponding vehicle currently accesses. A mobile communication provider may be configured to expand VoLTE coverage in PLMN units, TAC group units, TAC units, BS units, and cell units according to business strategy and network expansion plan. As another example, the mobile communication provider may be configured to expand VoLTE coverage in province units, city units, county units, etc. according to business strategy and network expansion plan.

Although FIG. 2 illustrates that information recorded in the position information field 206 is TAC information, this is merely an example. It may be noted that different values may be applied according to VoLTE coverage expansion strategy of a mobile communication provider. Referring to FIG. 2, according to VoLTE coverage expansion of the mobile communication provider, TAC 2 may be assumed to be in a state in which the VoLTE function may be supported. In particular, when a current VoLTE setting state of a vehicle with a VIN "A222222222" (hereinafter, simply referred to as a vehicle A) is "OFF" and a current location of the vehicle A is TAC 2, the telematics center 30 may be configured to set the VoLTE applicable state of the vehicle A to "ON" and transmit a predetermined VoLTE setting change request message for activation of the VoLTE function to the vehicle A.

When the vehicle A moves to TAC 1 from TAC 2 (e.g., TAC 1 is not a VoLTE service region), the telematics center 30 may be configured to set the VoLTE applicable state to "OFF" and transmit a predetermined VoLTE setting change request message for deactivating the VoLTE function to the vehicle A. The mobile communication center 30 may be configured to identify whether VoLTE may be supported for each respective vehicle type or vehicle and update the VoLTE applicable state field 205. For example, a communication modem which cannot provide an LTE function may be mounted in some vehicles. In particular, irrespective of change in VoLTE coverage, the value of the VoLTE applicable state field 205 corresponding to the corresponding vehicle may be maintained in an "OFF state".

FIG. 3 is an exemplary block diagram for explanation of an internal structure of a vehicle telematics terminal according to an exemplary embodiment of the present invention. Referring to FIG. 3, the vehicle telematics terminal 10 may include a vehicle head unit 310 and a communication modem 320. In addition, an integrated antenna 330 may be formed on one side of an external portion of the vehicle, in which the vehicle telematics terminal 10 may be installed.

The integrated antenna 330 may include a 3G antenna 332 and a 4G antenna 333 and a signal received through the 3G antenna 332 and the 4G antenna 333 may be transmitted to the communication modem 320. Continuously, the communication modem 320 may be configured to internally process the received signal and transmit the signal to a transceiver 313 of the vehicle head unit 310. In addition, the integrated antenna 330 may include a GPS antenna 331 and a GPS satellite signal received through the GPS antenna 331 may be transmitted to a determination unit 311 of the vehicle head unit 310.

The vehicle head unit 310 may include the determination unit 311, an input unit 312, the transceiver 313, an output unit 314, a switching unit 315, a controller 316, etc. The controller 316 may be configured to operate the vehicle head unit 310 and the various units thereof. The determination unit 311 may be configured to calculate a current geographic position of a vehicle using a signal received through the GPS antenna 331. In particular, the calculated geographic position information may include latitude and longitude information of the vehicle position. The vehicle head unit 310 may be configured to acquire geographical address information (e.g., the geographical address information may include city/province information, county/district information, dong/myeon/ri, information, etc.—corresponding to the latitude and longitude calculated using internally stored map information).

In addition, the determination unit 311 may be configured to acquire system information from the communication modem 320 and extract network position information in a network that the corresponding communication modem 320 accesses. Particularly, the network position information may include PLMN identifier information, TAC information, cell identifier information, etc. The controller 316 may be configured to transmit the vehicle position information calculated or extracted by the determination unit 311 to the mobile communication center 30 via the communication modem 320 and the integrated antenna 330.

The input unit 312 may be used to input an audio signal or a video signal and may include an imaging device (e.g., a camera, a video camera, or the like), a microphone, and so on. The imaging device may be configured to process an image frame such as a still image or a moving picture captured by an image sensor in a videotelephony mode or a photographing mode. The processed image frame may be displayed on the output unit 314. The image frame processed by the imaging device may be transmitted to an internal memory or may be externally transmitted via the communication modem 320. A plurality of imaging devices may be used according to specification of a terminal.

The microphone may be configured to receive an external sound signal therethrough in a voice/image call mode, a record mode, a voice recognition mode, or the like and convert the external sound signal into voice data. For a call mode, the converted voice data may be converted into a form for transmission to a mobile communication BS that the communication modem 320 accesses. In the microphone, various noise removal algorithms may be implemented to remove noise generated while receiving the external sound signal. The transceiver 313 may be configured to transmit information received through the controller 316 to the communication modem 320 or transmit information received via the communication modem 320 to the controller 316. The communication modem 320 and the vehicle head unit 310 may be connected via a communication network within the vehicle. The output unit 314 may be used to generate output associated with sight, hearing, touch, or the like and may include a display module, a sound output module, an alarm module, a haptic module, and so on.

The display module may be configured to display and output information processed by the vehicle head unit 310.

For example, when the vehicle head unit 310 is in a call mode, the display module may be configured to display a user interface (UI) or a graphical user interface (GUI) associated with calling. When the vehicle head unit 310 is in a videotelephony mode or a photographing mode, the display module may be configured to display a captured and/or received image, a UI, or a GUI. The display module may include at least one of a liquid crystal display (LCD), a thin film transistor-liquid crystal display, an organic light-emitting diode, a flexible display, and three dimensional (3D) display.

Among these, some displays may be configured to be of a transparent type or a light transmitting type to view the exterior therethrough. This may be referred to as a transparent display and a representative example of the transparent display may be a transparent LCD or the like. The transparent display may be configured with a light transmitting structure or a rear structure of the display module. Through this structure, a user may view an object positioned behind the display through a region occupied by the display module of a body of the vehicle head unit 310.

The vehicle head unit 310 may include two or more display modules according to exemplary embodiment form. For example, the vehicle head unit 310 may include a plurality of display modules spaced apart from each other or integrally disposed on one surface or disposed on different surfaces. When a display module and a sensor (hereinafter, referred to as a 'touch sensor') configured to detect a touch operation constitute an interlayer structure (hereinafter, referred to as a 'touchscreen'), the display module may be used as an input device as well as an output device. The touch sensor may have the form of, for example, a touch film, a touch sheet, a touch pad, and the like. The touch sensor may be configured to convert change in pressure applied to a specific portion of the display module, capacity generated at a specific portion of the display module, or the like into an electrical input signal. The touch sensor may be configured to detect touch pressure as well as a touching position and area.

When touch input is performed on the touch sensor, signal(s) corresponding to the touch input may be transmitted to a touch controller. The touch controller may be configured to process the signal(s) and transmit corresponding data to the controller 316. Thus, the controller 316 may be configured to recognize a region of the display, on which the touch input is performed. In particular, a proximity sensor module may be disposed in an internal region of the vehicle head unit 310, surrounded by the touch sensor, or disposed in the vicinity of the touchscreen. The proximity sensor module may be a sensor configured to detect whether an object is approaching a predetermined detection surface or an object present in the vicinity of the detection surface using force of electromagnetic field or infrared light without mechanical contact. The proximity sensor module may have a substantially long lifespan and high usage compared with a contact type sensor module.

The proximity sensor module may be, for example, a transmissive photoelectric sensor, a direct reflective photoelectric sensor, a mirror reflective photoelectric sensor, a high-frequency oscillation-type proximity sensor, a capacitive proximity sensor, a magnetic proximity sensor, an infrared proximity sensor, and so on. When the touchscreen is of a capacitive type, the proximity sensor module may be configured to detect proximity of a pointer by change in an electric field according to proximity of the pointer. In particular, the touchscreen (touch sensor) may be classified as a proximity sensor module.

The sound output module may be configured to output audio data stored in an internal memory or received from the communication modem 320 in a call signal reception mode, a call mode, a record mode, a voice recognition mode, or the like. The sound output module may further be configured to output a sound signal associated with a function (e.g., call signal receiving sound, message receiving sound, etc.) performed by the vehicle head unit 310. The sound output module may include a receiver, a speaker, a buzzer, and so on. In addition, the sound output module may be configured to output sound through an earphone jack disposed at one side of the vehicle or the vehicle head unit 310.

The alarm module may be configured to output a signal for event occurrence of the vehicle head unit 310. An example of the event generated in the vehicle head unit 310 may include call signal reception, message reception, key signal input, touch input, and so on. The alarm module may be configured to output other forms of signals in addition to a video signal or an audio signal, for example, a signal indicating event occurrence via oscillation. The video signal or the audio signal may be output through the display module or the sound output module.

The switching unit 315 may be configured to perform a switching function between a 3G communication unit 321 and a 4G communication unit 322 based on a control signal of the controller 316. For example, upon receiving a predetermined control message indicating VoLTE function activation from the mobile communication center 30 while a 3G communication function is activated, the controller 316 may be configured to transmit a predetermined control signal that indicates switching into the 4G communication unit 322 to the switching unit 315. As another example, upon receiving a predetermined control message indicating VoLTE function deactivation from the mobile communication center 30 while a 4G communication function is activated, the controller 316 may be configured to transmit a predetermined control signal indicating switching into the 3G communication unit 322 to the switching unit 315.

Although not illustrated in FIG. 3, the vehicle head unit 310 may further include a memory unit, an input key module, and an identification module. The memory unit may be configured to store a program for an operation of the controller 316 and may be configured to temporally store input/output data (e.g., an address list, a message, a still image, a moving picture, an application program, etc.). In particular, the application program may include map software, a game, chat software, web surfing schedule management, finance, a dictionary, and so on.

The memory unit may further be configured to store data regarding sound and oscillation of various patterns output during touch input on the touchscreen. The memory unit may include at least one type of storage medium of a flash memory type, a hard disk type, a multimedia card micro type, a card type memory (e.g., an SD or XD memory, etc.), a random access memory (RAM), a static random access memory (SRAM), a read only memory (ROM), an electrically erasable programmable read-only memory (EEPROM), a programmable read-only memory (PROM), a magnetic memory, a magnetic disc, an optical disc, and so on.

The input key module may be configured to generate input data to operate the vehicle head unit 310 by a user. The input key module may be configured with a key pad dome switch, a touch pad (e.g., static pressure/electrostatic), jog wheel, jog switch, and so on. The identification module may be a chip for storing information for authentication of access privilege for a mobile communication network and access privilege for a telematics service through the vehicle head unit 310 and may include a user identity module (UIM), a subscriber identity module (SIM), a universal subscriber identity module (USIM), and so on. A device (hereinafter, referred to as an "identification device") including the identification module may be fabricated in the form of smart card. Accordingly, the identification device may be connected to the vehicle head unit 310 through a predetermined port.

The controller 316 of the vehicle head unit 310 according to another exemplary embodiment of the present invention may be configured to transmit a predetermined control signal to the communication modem 320 and operate the 3G communication unit 321 and the 4G communication unit 322 to be selectively driven in the communication modem 320. In particular, the switching unit 315 may not be used and the 3G communication unit 321 and the 4G communication unit 322 may be connected directly to the vehicle head unit 310.

Figure 4:
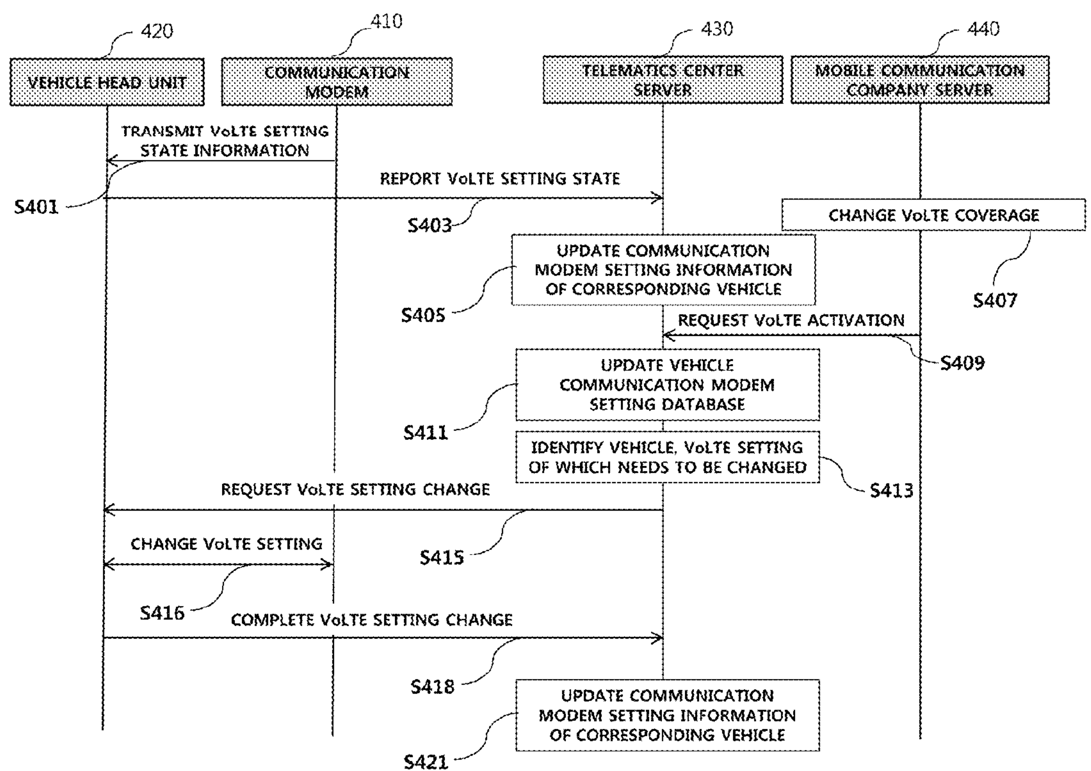
FIG. 4 is an exemplary flowchart for explanation of a method for controlling a communication mode of a telematics terminal according to an exemplary embodiment of the present invention.

FIG. 4 is an exemplary flowchart for explanation of a method for controlling a communication mode of a telematics terminal according to an exemplary embodiment of the present invention. Referring to FIG. 4, a communication modem 410 may be configured to transmit VoLTE setting state information to the vehicle head unit 420 based on a control signal of a vehicle head unit 420 (S401).

The vehicle head unit 420 may be configured to transmit a VoLTE setting state report message including vehicle identification information to a telematics center server 430 via the communication modem 410 (S403). The telematics center server 430 may be configured to update communication modem setting information of a vehicle that corresponds to the vehicle identification information (S405).

When VoLTE coverage is changed, a mobile communication company server 440 may be configured to transmit a VoLTE activation request message including VoLTE application time information, VoLTE service target vehicle type information, and VoLTE application coverage information to the telematics center server 430 (S407 to S409). The telematics center server 430 may be configured to update the vehicle communication modem setting DB 200 based on information including a received VoLTE activation request message and identify a vehicle, VoLTE setting of which requires a change, with reference to the updated vehicle communication modem setting DB 200 (S411 to S413).

The telematics center server 430 may be configured to transmit the VoLTE setting change request message to the vehicle head unit 420 of the vehicle, VoLTE setting of which requires a change (S415). In particular, the VoLTE setting change request message may include a VoLTE activation indicator. For example, a value of the VoLTE activation indicator as "1" indicates VoLTE function activation, and a value of the VoLTE activation indicator as "0" indicates VoLTE function deactivation.

The vehicle head unit 420 may be configured to activate or deactivate the VoLTE function of the communication modem 410 with reference to the VoLTE activation indicator included in the VoLTE setting change request message. Then the vehicle head unit 420 may be configured to transmit a VoLTE setting change complete message to the telematics center server 430 (S418). Upon receiving the VoLTE setting change complete message, the telematics center server 430 may be configured to update the value of the VoLTE setting state field 204, corresponding to the corresponding vehicle (S421).

Figure 5:
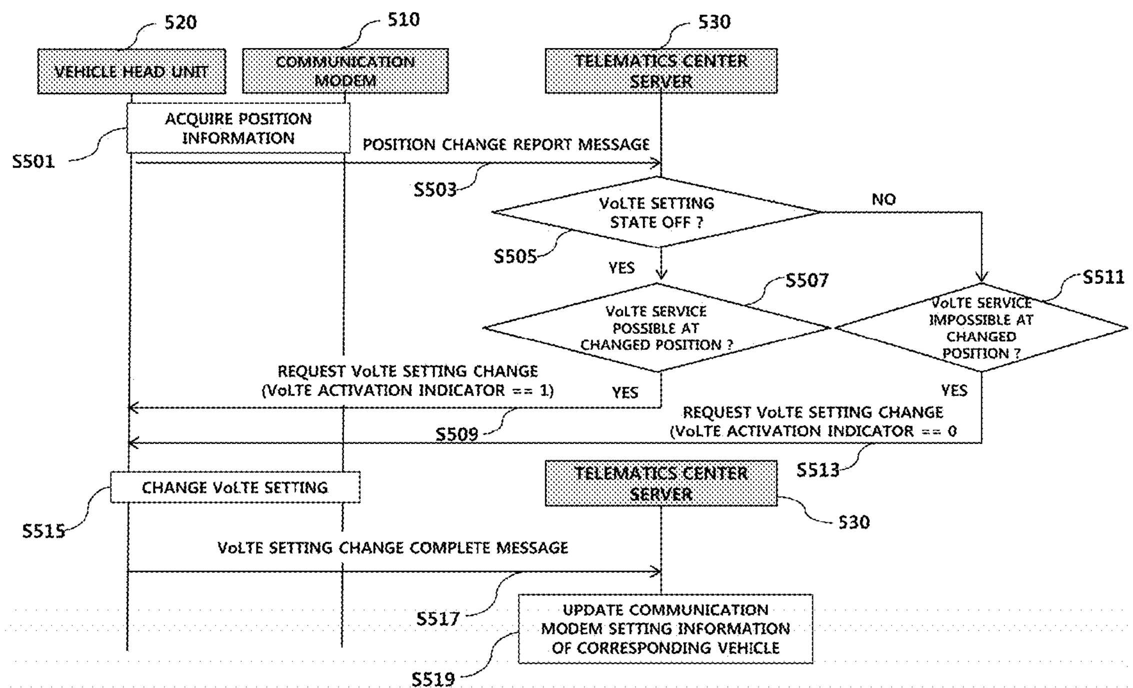
FIG. 5 is an exemplary flowchart for explanation of a method for controlling a communication mode of a telematics terminal according to another exemplary embodiment of the present invention.

FIG. 5 is an exemplary flowchart for explanation of a method for controlling a communication mode of a telematics terminal according to another exemplary embodiment of the present invention. Referring to FIG. 5, a vehicle head unit 520 may be configured to acquire position information from system information received from a communication modem 510 and transmit a predetermined position change report message including vehicle identification information and changed position information to a telematics center server 530 when a position of the corresponding vehicle is changed (S501 to S503).

The telematics center server 530 may be operated by a processor and may be configured to determine whether a VoLTE setting state of the vehicle corresponding to the vehicle identification information is "OFF" with reference to the internal vehicle communication modem setting DB 200 (S505). As a result, when the VoLTE setting state is "OFF", the telematics center server 530 may be configured to detect whether a VoLTE service is possible at the changed position (S507). When the VoLTE service is possible at the changed position, the telematics center server 530 may be configured to transmit a VoLTE setting change request message, a VoLTE activation indicator of which is set to "1", to the vehicle head unit 520 (S509). In particular, a value of the VLTE activation indicator as 1 indicates that a VoLTE function of the corresponding vehicle requires a change to an activation state from a deactivation state, and a value of the VLTE activation indicator as 0 indicates that the VoLTE function of the corresponding vehicle requires a change to a deactivation state from an activation state.

As the detected result of the above step 505, when the VoLTE setting state is "ON", the telematics center server 530 may be configured to detect whether the VoLTE service is impossible at the changed position (S511). As a result, when the VoLTE service is impossible, the telematics center server 530 may be configured to transmit a VoLTE setting change request message, a VoLTE activation indicator of which is set to "0", to the vehicle head unit 520 (S513). The vehicle head unit 520 may be configured to activate or deactivate the VoLTE function of the communication modem 510 based on the received VoLTE activation indicator (S515). Then the vehicle head unit 520 may be configured to transmit the VoLTE setting change complete message to the telematics center server 530 (S517). Upon receiving the VoLTE setting change complete message, the telematics center server 530 may be configured to update the voltage of the VoLTE setting state field 204, corresponding to the corresponding vehicle (S519).

Figure 6:
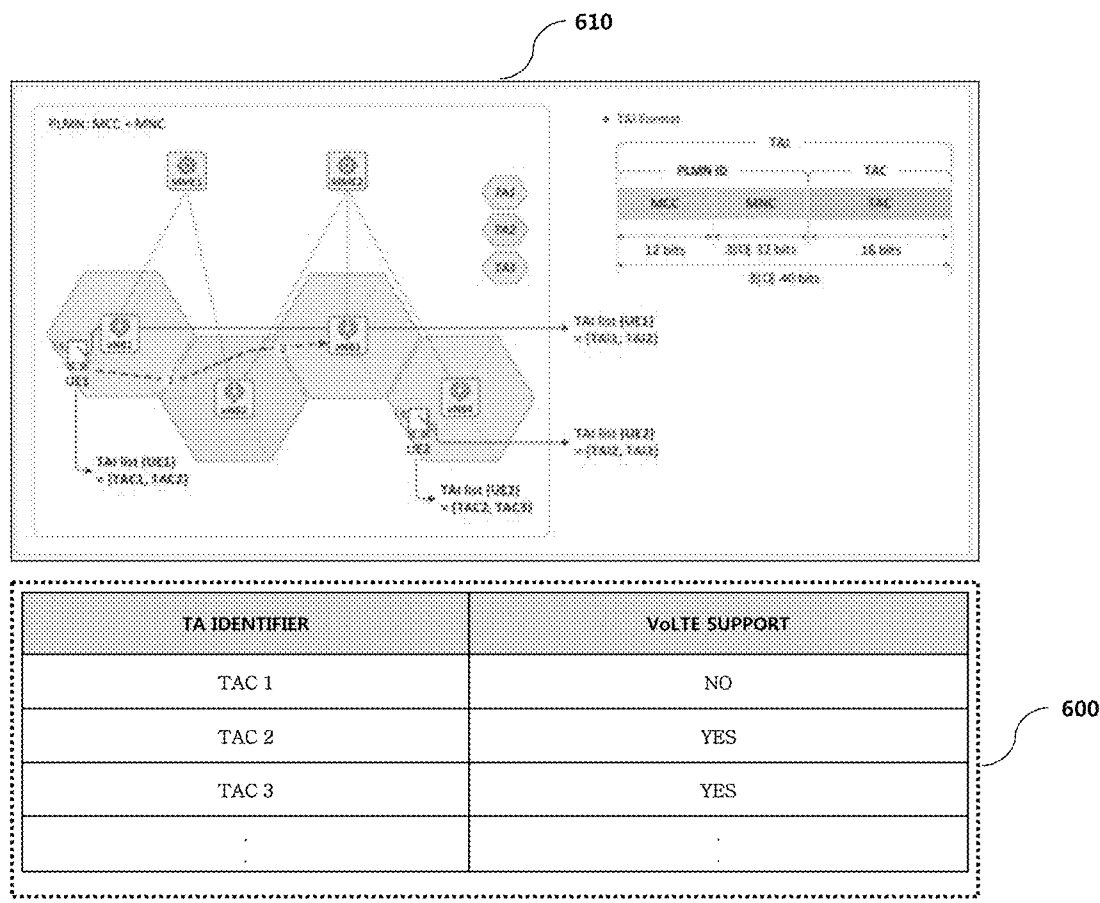
FIG. 6 is an exemplary diagram for explanation of a method for controlling a communication mode of a telematics terminal based on position information according to another exemplary embodiment of the present invention.

FIG. 6 is an exemplary diagram for explanation of a method for controlling a communication mode of a telematics terminal based on position information according to another exemplary embodiment of the present invention. Referring to FIG. 6, an LTE network may include a mobility management entity (MME) and an eNB as a BS.

The MME may be configured to allocate a predetermined tracking area (TA) called a tracking area identifier (TAI) list to a UE when the UE is registered with an LTE network. In particular, the TA may be identified by a tracking area code (TAC). When the UE is moved to a TA included in a TAI list from a current TA, the UE may not transmit a TA update request message to the MME. Further, when the UE is moved to a TA not present in the TAI list or a predetermined TA update period elapses, the UE may be configured to transmit a TA update request message to the MME. The MME may be configured to allocate different respective TAI lists to UEs according to TAI allocation strategy and the UE may acquire currently accessed TA through system information received from the eNB.

The eNB may be configured to recognize a MME and a TA to which the eNB belongs, through a predetermined provisioning procedure in an installation process. Each cell of the eNB broadcasts a cell ID (ECI or ECGI) and a TA value (TAC or TAI) in the form of system information. A UE that intends to access a new cell may be configured to receive system information that the cell broadcasts and detect whether the TA to which the UE belongs is changed or the UE belongs to the same TA.

Hereinafter, an operation of a UE to which a TAI list is allocated will be described in detail with reference to a reference numeral 610. It may be assumed that eNB1 belongs to TA1, eNB2 belongs to TA2, and eNB3 and eNB4 belong to TA3. In particular, the TA may be allocated in cell units. However, here, the TA is described as allocated in units of eNBs.

The current case corresponds to a case in which the UE1 is registered in MME1 and is allocated {TAI1, TAI2} as a TAI list and the UE2 is registered in MME2 and is allocated {TAI2, TAI3} as a TAI list. When the UE1 that accesses a network in the eNB1 becomes in an idle state and then moves to eNB2 and eNB3 from eNB1 along dotted lines, an operation of the UE1 will now be described. In general, a TA may be checked in cell units. However, for convenience of description, an operation of a case in which a cell is changed in the eNB is omitted.

When the UE1 is within eNB1 coverage, a current TA of the UE1 is TA1. Upon moving to eNB2 from eNB1 (e.g., ① in reference numeral 610), the UE1 may be configured to listen to system information of a cell that the UE1 intends to newly access and recognize a new TA as TA2. The UE1 may further be configured to detect whether the TA2 is included in a pre-allocated TAI list and may not update a position since the TA2 is included in the TAI list. Further, upon moving to eNB3 from eNB2 (e.g., ② in reference numeral 610), the UE1 may be configured to listen to system information of a cell that the UE1 intends to newly access and recognize a TA as TA3. The UE1 may be configured to detect whether the new TA is included in the TAI list. The UE1 may further be configured to transmit a tracking area update (TAU) message to the MME and update a position since the TA3 is not included in the TAI list.

The mobile communication center 30 may be configured to receive a predetermined VoLTE coverage table 600 showing whether VoLTE is supportable, from the mobile communication company server 40. The mobile communication company server 40 may be configured to transmit corresponding change information to the mobile communication center 30 in real time when the VoLTE coverage is changed. Upon receiving current TA information from the telematics terminal 10, the mobile communication center 30 may be configured to detect whether the VoLTE service is possible in the corresponding TA with reference to the VoLTE coverage table 600.

As is apparent from the above description, the method and apparatus according to the present invention have the following effects.

First, the present invention has an advantage of providing a method and system for controlling communication mode of a telematics terminal.

Second, the present invention has an advantage of providing a method and system for controlling communication mode of a telematics terminal, for adaptively controlling a VoLTE function of a vehicle telematics terminal according to change in network coverage for the VoLTE function.

Third, the present invention has an advantage of providing a method and system for controlling communication mode of a telematics terminal, for minimizing user inconvenience by installing an LTE communication modem during vehicle mass application and automatically activating a VoLTE function without any separate user manipulation when the VoLTE is supportable after a legacy 3G network is eliminated.

Fourth, the present invention has an advantage of providing a method and system for controlling communication mode of a telematics terminal, for ensuring service continuity for voice communication without replacement of a separate telematics terminal or separate compensation costs according to support for the VoLTE function of a mobile communication company.

It will be appreciated by persons skilled in the art that that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a communication mode in a telematics center associated with a telematics terminal and a mobile communication company server through a mobile network, comprising:

receiving, by a controller, a voice over LTE (VoLTE) setting state report message including VoLTE setting state information corresponding to the telematics terminal from the telematics terminal;

receiving, by the controller, a VoLTE activation request message including VoLTE service application time information indicating whether a VoLTE service application time has been reached from the mobile communication company server;

determining, by the controller, whether a VoLTE setting requires a change for the telematics terminal; and transmitting, by the controller, a VoLTE setting change request message to the telematics terminal when the VoLTE setting requires a change, wherein the VoLTE setting requires a change when the VoLTE service application time has been reached.

2. The method according to claim 1, wherein the VoLTE activation request message further comprises:

VoLTE serviceable coverage information on the mobile communication network, wherein whether VoLTE setting for the telematics terminal requires a change is determined based further on the coverage information.

3. The method according to claim 1, wherein the VoLTE activation request message further comprises:

VoLTE service application target vehicle type information, wherein whether a vehicle type corresponding to the telematics terminal corresponds to the target vehicle type information is determined and the VoLTE setting change request message is transmitted to the telematics terminal.

4. The method according to claim 1, further comprising:

receiving, by the controller, a VoLTE setting change complete message from the telematics terminal; and updating, by the controller, VoLTE setting state information corresponding to the telematics terminal.

5. The method according to claim 1, further comprising:

receiving, by the controller, changed position information from the telematics terminal, wherein, when a VoLTE service is possible at the changed position, the VoLTE setting change request message for activation of a VoLTE function is transmitted to the telematics terminal.

6. The method according to claim 5, wherein, when the VoLTE service is impossible at the changed position, the VoLTE setting change request message for deactivation of the VoLTE function is transmitted to the telematics terminal.

7. The method according to claim 5, wherein the changed position information includes at least one selected from the group consisting of: public land mobile network (PLMN) identification information, tracking area (TA) identification information, and cell identification information.

8. A method for controlling a communication mode in a telematics terminal associated with a telematics center and a mobile communication company server through a mobile network, the method comprising:

transmitting, by a controller, a voice over LTE (VoLTE) setting state report message comprising current VoLTE setting state information and vehicle identification information corresponding to the telematics terminal, to the telematics center;

receiving, by the controller, a VoLTE setting change request message including a VoLTE activation indicator from the telematics center;

changing, by the controller, VoLTE setting installed in the telematics terminal based on the VoLTE activation indicator; and transmitting, by the controller, a VoLTE setting change complete message indicating that VoLTE setting of the telematics terminal is completed according to the VoLTE setting change request message, wherein the telematics center receives a VoLTE activation request message including VoLTE service application time information indicating whether a VoLTE service application time has been reached from the mobile communication company server, and the controller receives a VoLTE setting change request message from the telematics center when the VoLTE setting requires a change, wherein the VoLTE setting requires a change when the VoLTE service application time has been reached.

9. The method according to claim 8, further comprising:

acquiring, by the controller, position information of the telematics terminal; and transmitting, by the controller, the position information to the telematics center.

10. The method according to claim 9, wherein the position information is acquired from system information broadcast by a base station (BS) of the mobile communication network.

11. The method according to claim 10, wherein when the position information is changed, the changed position information is transmitted to the telematics center.

12. The method according to claim 9, wherein:

the position information is acquired through a global positioning system (GPS) signal; and the position information is transmitted to the telematics terminal whenever a vehicle having the telematics terminal installed therein moves by a predetermined distance.

13. The method according to claim 8, wherein:

the telematics terminal includes a communication modem having a third generation (3G) communication function and fourth generation (4G) communication function installed therein; and when a value of the VoLTE activation indicator indicates VoLTE function activation, the telematics terminal is configured to perform voice call using the 4G communication function, and when the value of the VoLTE activation indicator indicates VoLTE function deactivation, the telematics terminal is configured to perform voice call using the 3G communication function.

14. The method according to claim 8, wherein the vehicle identification information includes at least one selected from the group consisting of: a vehicle identification number (VIN), vehicle type information, and telephone number allocated to the telematics terminal.

15. A telematics center associated with a telematics terminal through a mobile communication network, the telematics center comprising:

a receiver configured to receive a voice over LTE (VoLTE) setting state report message including VoLTE setting state information corresponding to the telematics terminal generated by the telematics terminal and a VoLTE activation request message including VoLTE service application time information indicating whether a VoLTE service application time has been reached from the mobile communication company server via the mobile communication network;

a determiner configured to determine whether VoLTE setting for the telematics terminal requires a change; and a transmitter configured to transmit a VoLTE setting change request message including a VoLTE activation indicator to the telematics terminal via the mobile communication network when the VoLTE setting requires a change, wherein the VoLTE setting requires a change when the VoLTE service application time has been reached.

16. A telematics terminal associated with a telematics center through a mobile communication network, the telematics terminal comprising:

a transmitter configured to transmit a voice over LTE (VoLTE) setting state report message include current VoLTE setting state information and vehicle identification information corresponding to the telematics terminal, to the telematics center;

a receiver configured to receive a VoLTE setting change request message comprising a VoLTE activation indicator from the telematics center;

a changer configured to change VoLTE setting installed in the telematics terminal based on the VoLTE activation indicator; and a transmitter configured to transmit a VoLTE setting change complete message indicating that VoLTE setting of the telematics terminal is completed according to the VoLTE setting change request message, wherein the telematics center receives a VoLTE activation request message including VoLTE service application time information indicating whether a VoLTE service application time has been reached from the mobile communication company server, and the receiver receives a VoLTE setting change request message from the telematics center when the VoLTE setting requires a change, wherein the VoLTE setting requires a change when the VoLTE service application time has been reached.

17. A non-transitory computer readable medium containing program instructions executed by a controller, the computer readable medium comprising:

program instructions that receive a voice over LTE (VoLTE) setting state report message including VoLTE setting state information corresponding to a telematics terminal generated by the telematics terminal via the mobile communication network;

program instructions that receive a VoLTE activation request message including VoLTE service application time information indicating whether a VoLTE service application time has been reached from a mobile communication company server;

program instructions that determine whether a VoLTE setting for the telematics terminal requires a change; and program instructions that transmit a VoLTE setting change request message including a VoLTE activation indicator to the telematics terminal via the mobile communication network when the VoLTE setting requires a change, wherein the VoLTE setting requires a change when the VoLTE service application time has been reached.

* * * * *